(12) United States Patent
Hannon

(10) Patent No.: US 12,043,211 B2
(45) Date of Patent: Jul. 23, 2024

(54) AUTONOMOUS VEHICLE SECURITY

(71) Applicant: Tegere, Inc., Gilbert, AZ (US)

(72) Inventor: Marwan Hannon, Fairfield, CA (US)

(73) Assignee: Tegere, Inc., Gilbert, AZ (US)

( * ) Notice: Subject to any disclaimer, the term of this patent is extended or adjusted under 35 U.S.C. 154(b) by 0 days.

(21) Appl. No.: 17/507,021

(22) Filed: Oct. 21, 2021

(65) Prior Publication Data

US 2022/0126787 A1 Apr. 28, 2022

Related U.S. Application Data

(60) Provisional application No. 63/105,059, filed on Oct. 23, 2020.

(51) Int. Cl.
*B60R 25/24* (2013.01)

(52) U.S. Cl.
CPC ...... *B60R 25/241* (2013.01); *B60R 2325/205* (2013.01)

(58) Field of Classification Search
CPC .................. B60R 25/241; B60R 2325/205
See application file for complete search history.

(56) References Cited

U.S. PATENT DOCUMENTS

2019/0294162 A1* 9/2019 Sikorski ............ B60W 50/0098
2021/0358025 A1* 11/2021 Rosekrans ............... G07C 5/02

* cited by examiner

Primary Examiner — Omeed Alizada
(74) Attorney, Agent, or Firm — Haynes and Boone, LLP

(57) ABSTRACT

In accordance with embodiments of this disclosure, a method of securing an autonomous vehicle is presented. The method includes receiving a request for an action at the autonomous vehicle; requesting permission from a user device that has been paired with the autonomous vehicle; and performing the action if permission is received from the user device.

12 Claims, 4 Drawing Sheets

AUTONOMOUS VEHICLE SECURITY

RELATED APPLICATION

The present disclosure declares priority to U.S. Provisional Application 63/105,059, entitled "AUTONOMOUS VEHICLE SECURITY," filed on Oct. 23, 2020, which is herein incorporated by reference in its entirety.

TECHNICAL FIELD

Embodiments of the present invention are related to security for autonomous vehicle operation.

DISCUSSION OF RELATED ART

Autonomous vehicles are being developed for a multitude of applications. Autonomous vehicles are under development and are various stages of deployment in all areas of transportation, including, but not limited to, marine shipping, aviation, trucking, passenger vehicles, rail, agricultural and industrial vehicles. A fully autonomous vehicle is capable of sensing its environment and making operation decisions to operate the vehicle without human involvement.

The level of automation, although the definition varies by industry, generally is classified from a level of no automation, through various levels of driver assistance levels, to high automation. In the automotive industry, the levels of automation can be classified as follows: 0—no automation; 1—driver assistance (e.g., cruise control); 2—partial automation (e.g., adaptive cruise control and lane following); 3—conditional automation (e.g. performing most tasks under human supervision); 4—high automation (e.g., the vehicle performs all driving tasks under specific circumstances); and 5—full automation (e.g., the vehicle performs all driving tasks under all conditions).

As vehicles are developed with higher levels of automation, operation security for these vehicles becomes increasingly of concern. As part of the automation, most developers are providing communications between similarly capable vehicles to facilitate safe operation. Further, as with many technology systems, updates to the operating software of the vehicle occur periodically.

Therefore, there is a need to develop security protocols to prevent malignant hacking in the automation vehicle.

SUMMARY

In accordance with embodiments of this disclosure, a method of securing an autonomous vehicle is presented. The method includes receiving a request for an action at the autonomous vehicle; requesting permission from a user device that has been paired with the autonomous vehicle; and performing the action if permission is received from the user device.

These and other embodiments are discussed below with respect to the following figures.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
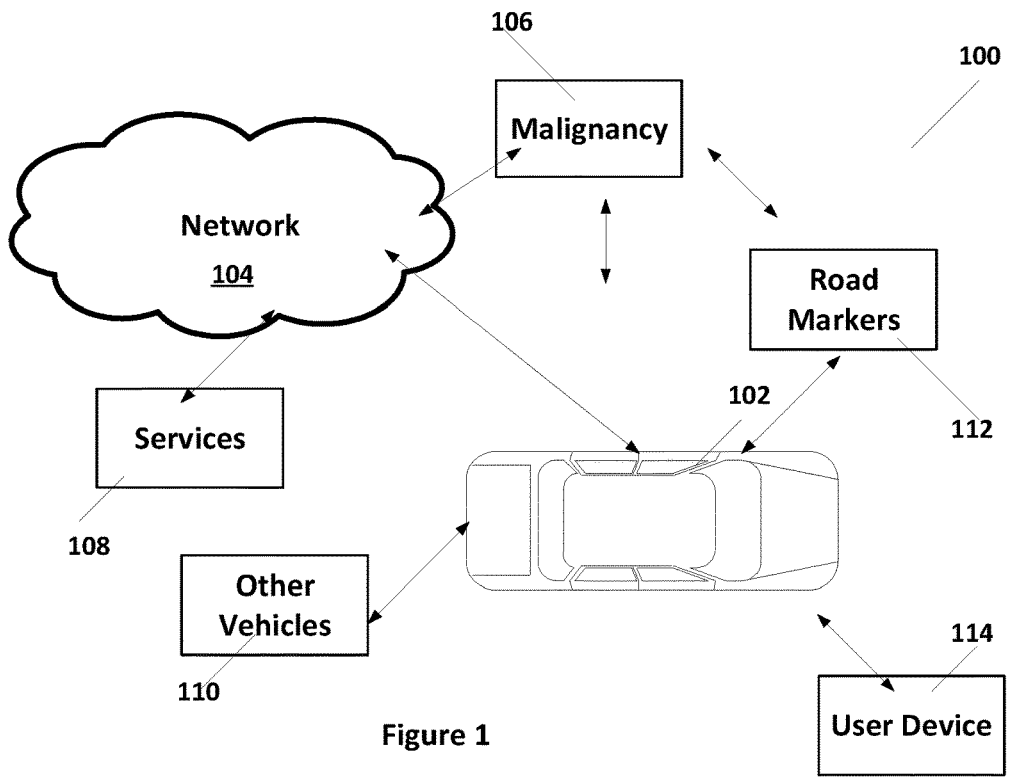
FIG. 1 illustrates an autonomous vehicle communications environment.

FIG. 1 illustrates aspects of the communications environment of an autonomous vehicle 102. Although autonomous vehicle 102 is depicted, and discussed further, with the example of an automobile, aspects of the present disclosure are applicable to other autonomous vehicles.

As is illustrated in FIG. 1, vehicle 102 communicates with services 108 through a cloud-based network 104. Services 108 includes any monitoring and servicing program. Services 108 are typically available when vehicle 102 is deployed and often monitors operating parameters, updates software, and performs other tasks for vehicle 102. Services 108 can also be subscription services that provides navigational maps and other specific data to vehicle 102. Furthermore, vehicle 102 often can communicate with other vehicles 110 that are in the close vicinity of vehicle 102 as well as road markers 112. In some cases, vehicle 102 communicates with other vehicles 110 to coordinate traffic, turns, lane changes or other activities. Vehicle 102 can read road markers 112 that are designed to transmit signals. Road markers 112 can be, for example, road markers, traffic lights, or other road indications.

Further, as is illustrated in FIG. 1, vehicle 102 is also in communication with a user device 114. User device 114 can be any associated device, for example a smart phone, computer, wearable device, tablet, or other device that is capable of communicating with an end user, with vehicle 102, and with network 104.

However, as is further illustrated in FIG. 1, a malignant actor 106 (e.g. a hacker) may also be present in the system. Hacking an automobile may well become a national pastime for hackers who will have billions of vehicles to hack. Embodiments of the present disclosure illustrate using user device 114 to prevent hacking of vehicle 102.

Although embodiments are discussed in the context of an autonomous vehicle, aspects of this disclosure can also be used in other devices such as, for example, electronic logging devices that are mandated and used in fleets throughout the country. Access to those devices can be authenticated in the same ways as is discussed below.

Figure 2:
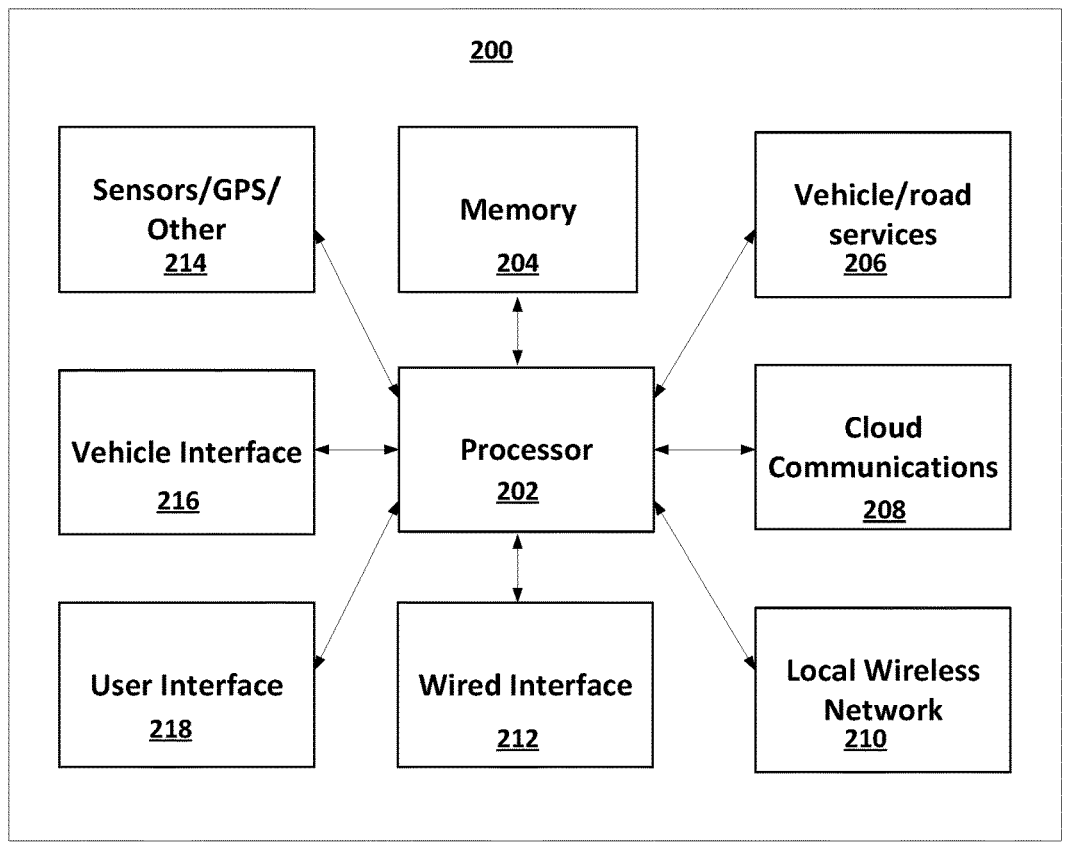
FIG. 2 illustrates a schematic of a system operating an autonomous vehicle according to some embodiments.

FIG. 2 illustrates a processing unit 200 that illustrates operation of vehicle 102. As illustrated in FIG. 2, processing unit 200 includes a processor 202 and memory 204. Memory 204 can include any combination of forms of data storage, including volatile and non-volatile memory, removable storage such as CDs, solid state drives, USB drives, or other types of storage. Memory 204 includes instructions and data that are used to operate vehicle 102. In particular, processor 200 operates the instructions stored in memory 204 and using the data stored in memory 204.

Processor 204 can be any combination of microprocessors, microcomputers, application specific ICs (ASICs), state functions, or other devices or combinations of devices that are capable of operating as described below.

As is further illustrated in FIG. 2, processor 202 is coupled to various interfaces to exchange data with other devices. For example, processor 202 is coupled to a vehicle and road services block to communicate with road markers 112 and other vehicles 110. Further, processor 202 can be coupled to cloud communications 208 for communications with network 104 (through which services 108 operates). Processor 202 is further coupled to provide a local wireless network 210, which can be provide WiFi services, Bluetooth connections, or other wireless connections to local devices such as user device 114, for example. Alternatively, processor 202 may also be coupled to a wired interface 212 (e.g., ethernet, USB, or other such interface) that can be by devices internally to vehicle 102.

As is further illustrated, processor 202 is coupled to a vehicle interface 216 that interfaces with the vehicle itself so that processing unit 200 can control operation of vehicle 102. Vehicle interface 216 can include controls for steering and acceleration, monitoring of vehicle operations, etc.

As is further illustrated, processor 202 is further coupled to a sensor block 214 that includes, for example, all sensors incorporated in vehicle 102. These sensors can include, for example, GPS navigation, inertial sensors, radar, LIDAR, cameras, ultrasound, or other sensors that allow processing unit 200 to "see" its surroundings.

Processor 202 is also coupled to a user interface 218. User interface 218 can include any combination of video displays, touch screens, buttons, knobs, keyboards, audio microphones, speakers, and other devices that allows processing unit 200 to relay information (e.g., provide infotainment services, display GPS maps, provide vehicle specific messages, etc.) and receive input (e.g., vehicle parameter settings, radio stations, environmental controls, etc.) from a user of vehicle 102.

In accordance with embodiments of the present disclosure, memory 204 includes instructions that interact with services 108 and user device 114 to prevent hacking as discussed further below. In particular, as discussed below when a buyer purchases vehicle 102, the buyer's user device 114 can be paired with processing unit 200 and with services 108 to designate user device 114 as a master account holder. The buyer will have the ability to add other family members to the "driving" account. User device 114, and subsequent driving account devices, can be identified by the User Device ID of the handset. The UDID is unique to every user device 114 or smart. As an alternative, the UDID of the user device 114 can be a random number generated by services 108 to designate the devices that the user (owner) wants to use.

Once user device 114 is paired with processing unit 200 and services 108, user device 114 can be used to authenticate the driver when the vehicle sends a signal to user device 114 to verify the UDID. As discussed above, user device 114 may designate secondary devices that may be authenticated for this process. This process will prevent car thefts.

The verification process according to some embodiments will poll the handset periodically during a trip. Any instructions sent to vehicle 102 can be verified by user device 114, using the UDID of user device 114, any commands are executed. A hacker trying to hack into vehicle 102, then, will be thwarted by the verification process. If the vehicle OS does not receive confirmation, via Bluetooth, Ultrasound, Verbal Command, Facial Recognition, then the vehicle OS will send all identifying info from the hackers to a central repository to build a database for law enforcement investigation. The vehicle OS can further use AI to look for patterns to identify Hackers.

An authentication process according to some embodiments can be an added layer to whatever the OS providers bring to market, i.e. computers, IoT and any other device. Embodiments of the present embodiment may have use cases outside autonomous vehicles as well.

Figure 3A:
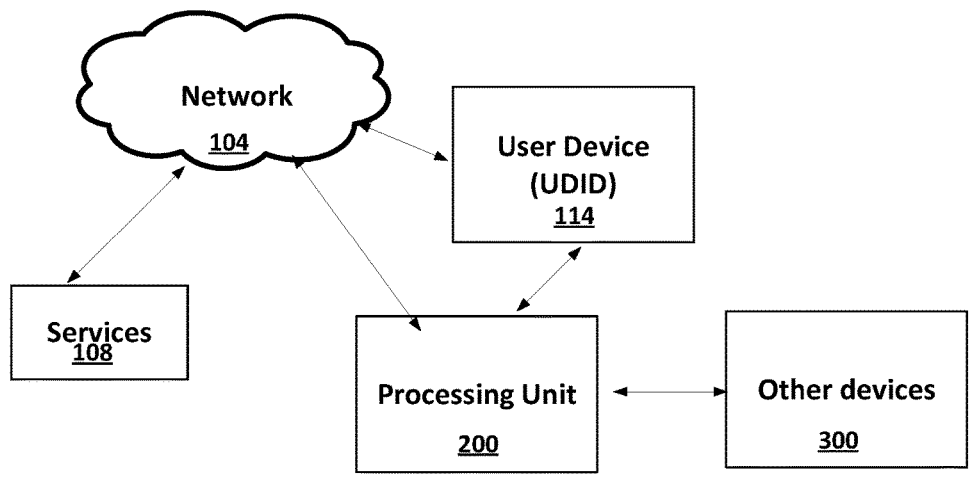
FIG. 3A illustrates communications between components in an autonomous vehicle according to some embodiments.

FIG. 3A further illustrates the communications environment in which vehicle 102 operates. As is illustrated in FIG. 3A, processing unit 200 of vehicle 102 is in communication through network 104 with services 108, with user device 114, and with other devices 300. In this disclosure, user device 114 includes a master device as discussed below. User device 114 can be used to designate driver devices that are allowed limited access to operate vehicle 102, but are not allowed to approve upgrades or other actions executed in processing unit 200.

Figure 3B:
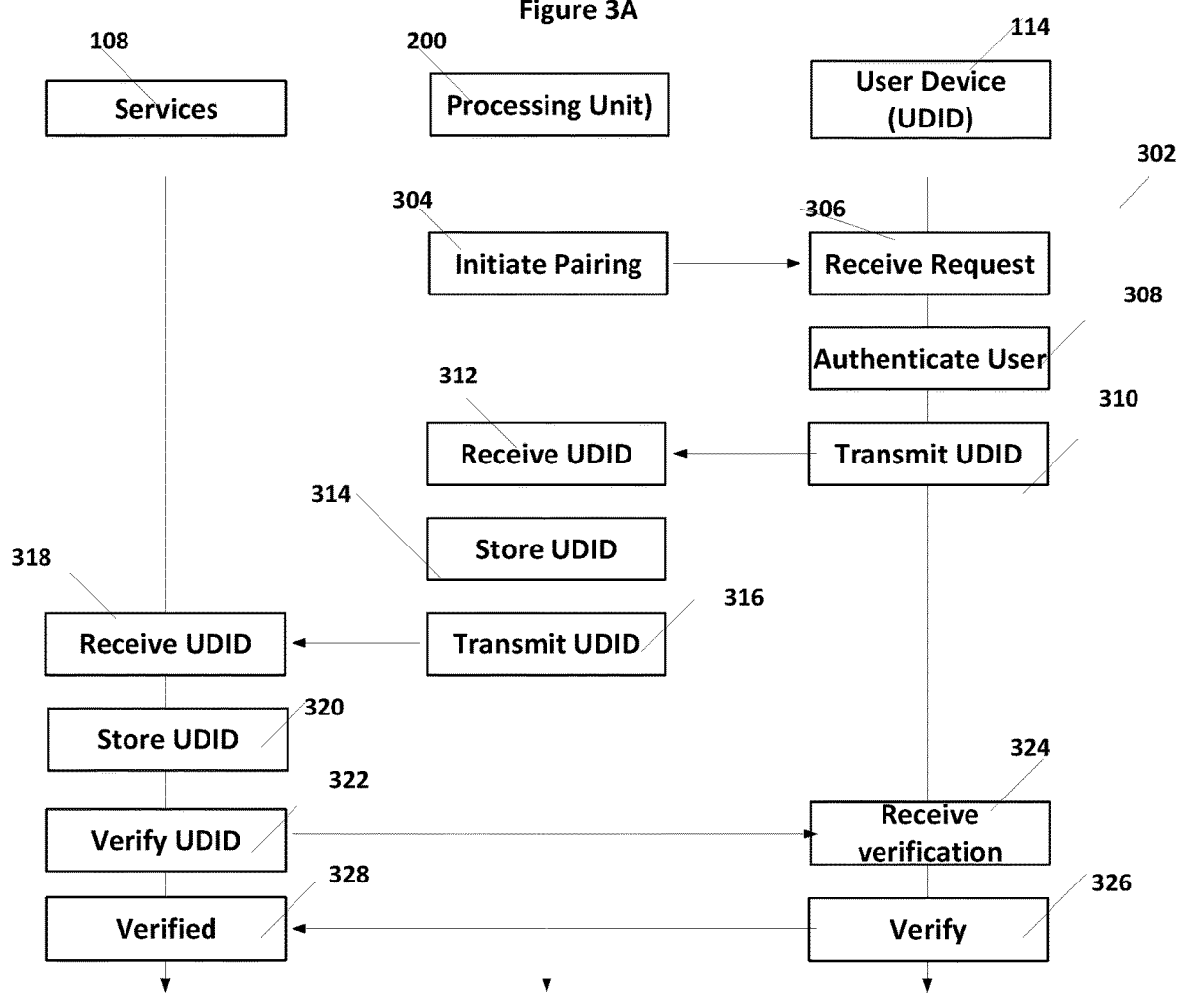
FIG. 3B illustrates a communications and operation of an autonomous vehicle according to some embodiments.

FIG. 3B illustrates the operation of pairing user device 114 with processing unit 200 according to some embodiments. As is illustrated in FIG. 3B, pairing process 302 starts in step 304 when processing 200 initiates pairing by detecting and sending a message to user device 114. In some embodiments, pairing 302 can be initialized in user device 114 instead. As discussed above, in some embodiments this pairing may be accomplished at a dealer site when vehicle 102 is purchased.

In step 306 on user device 114, the pairing initialization message is received from processing unit 200. In step 308 on user device 114, user device 114 authenticates the user and receives permission to pair. Authentication can be accomplished in a number of ways, including biometric recognition (e.g., fingerprint, facial, or voice recognition) or user input passwords. If the user is authenticated in step 308, and permission received to move forward, then user device 114 transmits its unique UDID to processing unit 200. Processing unit 200 receives the UDID in step 312 and stores it in step 314. In some embodiments, the UDID is then forwarded to services 108. Services 108 receives the UDID in steps 318 and stores in step 320. In some embodiments, services 108 may contact user device 114 separately (i.e., through network 104) in verify step 322. User device 114 may be contacted through a text message or email according to methods applicable to smart phones, tablets, or computer systems. In step 324, user device 114 receives the verification from services 108. In step 326, user device 114 again authenticates the user and has the user verify the pairing. In step 326, user device 114 contacts services 108 directly to verify the UDID. This verification is received in step 328. At this point, user device 114 and its UDID are registered with both processing unit 200 and services 108. In some embodiments, there may only be one master device for user device 114. However, as discussed above, user device 114 may designate other devices for lower levels of operation (e.g., operating vehicle 102 but not allowing software upgrade or parameter alteration). The UDIDs of additional user devices that are designated with master user device 114 are also stored in processing unit 200 and services 108, along with their security provisions providing for actions that are allowed by those additional devices.

Figure 4:
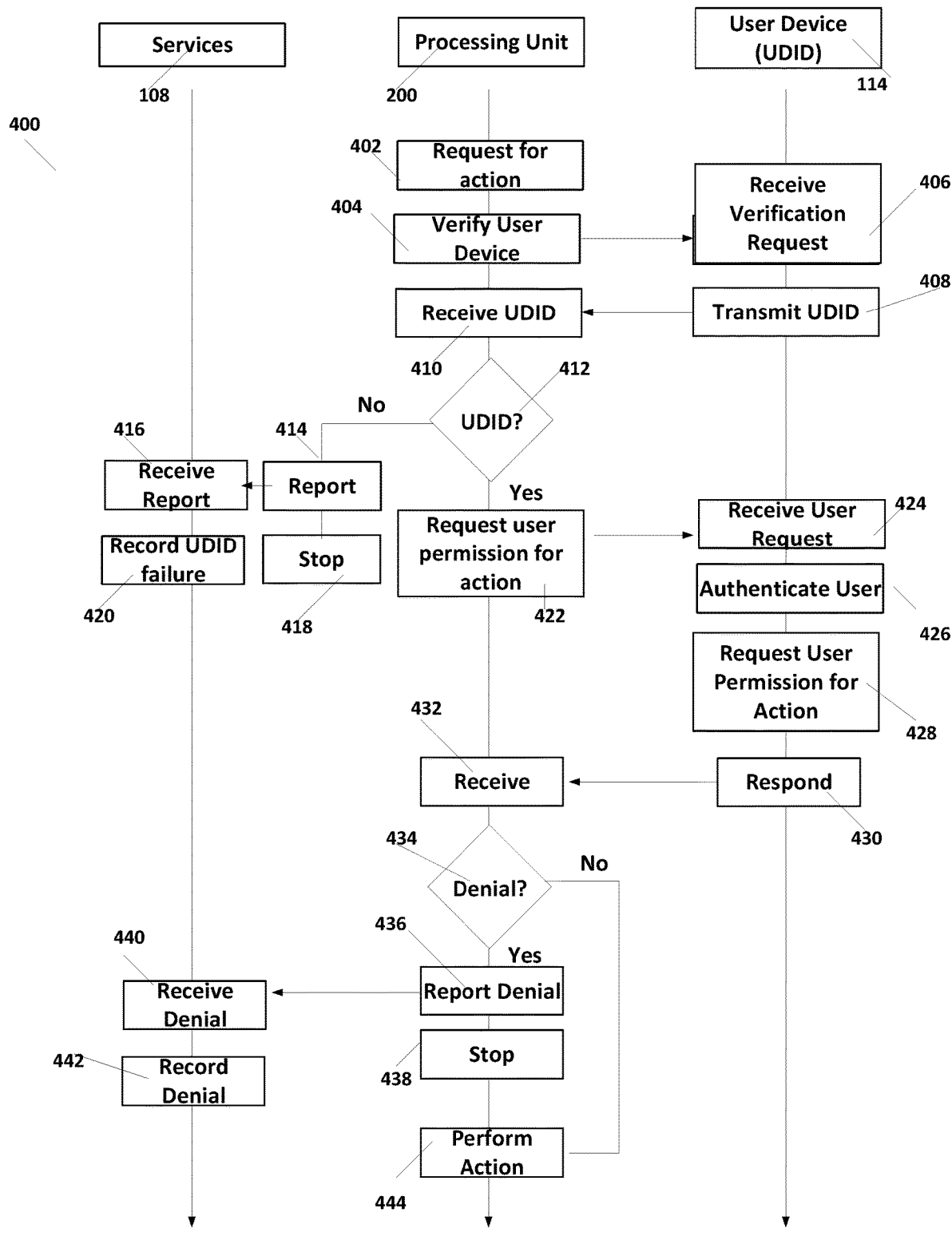
FIG. 4 further illustrates communications and operation of an autonomous vehicle according to some embodiments.

FIG. 4 illustrates an operation 400 according to some embodiments of the present invention. In step 402, processing unit 200 receives a request to perform some action. The action may be any action, for example unlocking vehicle 102, starting vehicle 102, setting operating parameters for vehicle 102, updating operating software in vehicle 102, uploading monitored parameters from vehicle 102, or any other action. The request for action can come from any source, including a user approaching the vehicle, wireless connections with processing unit 200, or requests through network 108 such as those coming from services 108.

When a request for action is received in step 402, then processing unit 200 proceeds to step 404 to verify the action with user device 114 and sends user device 114 a request for verification. In step 406 of user device 114, user device 114 receives the verification request into step 406. In step 406, depending on the action, user device 406 may proceed to step 408 to transmit its UDID. This is appropriate for actions such as operating the vehicle. For actions that require further verification, in step 406 user device 114 may further request permission from the user by authenticating the user as described above and verifying that the action is valid. In step 408, the UDID and permission (if needed) from the authenticated user is sent to processing unit 200. In step 412 of processing unit 200, processing unit 200 verifies the UDID to make sure it is valid. If not, then processing unit proceeds to step 414 to report the failure to verify to services 108 and stops the action in step 418. In step 416 of services 108, services 108 receives a report of a failure to verify UDID from step 414 and records the UDID failure in step 420. The failure can be recorded with the request and the source of the request. Services 108 can monitor the failed attempts through time to identify bad actors.

In step 412, if the UDID does match, then in step 422 processing unit 200 asks permission to perform the action from the user. Note that, in some cases such as simply operating the vehicle, verification of presence of user device 114 is sufficient for some actions. In those cases, processing unit 200 can skip to step 444 to perform the action (e.g., unlocking the doors, starting the vehicle, operating the vehicle).

However, for those actions that need user permission, in step 422 processing unit 200 requests user permission in step 422. In step 424 of user device 114, the request for user permission is received. In step 426, user device 114 authenticates the user, for example by using biometrics, entry of a password, or other security protocol. In step 428, if the authentication was successful, the user is asked to grant permission for the action. In step 430, user device 114 responds to processing unit 200 with the results (e.g., failure to authenticate, failure to receive permission, etc.). In step 432 of processing unit 200 the response from user device 114 is received. In step 434, if the permission is denied for any reason, then processing unit 200 proceeds to step 436 to report the denial to services 108. Processing unit 200 stops in step 438. In step 440 of services 108, services 108 receives a report of the failure to receive permission to perform the action. In step 442, that failure can be recorded. If, in step 434, the action is not denied, processing unit 200 proceeds to step 444 where the action is performed.

Figure 5:
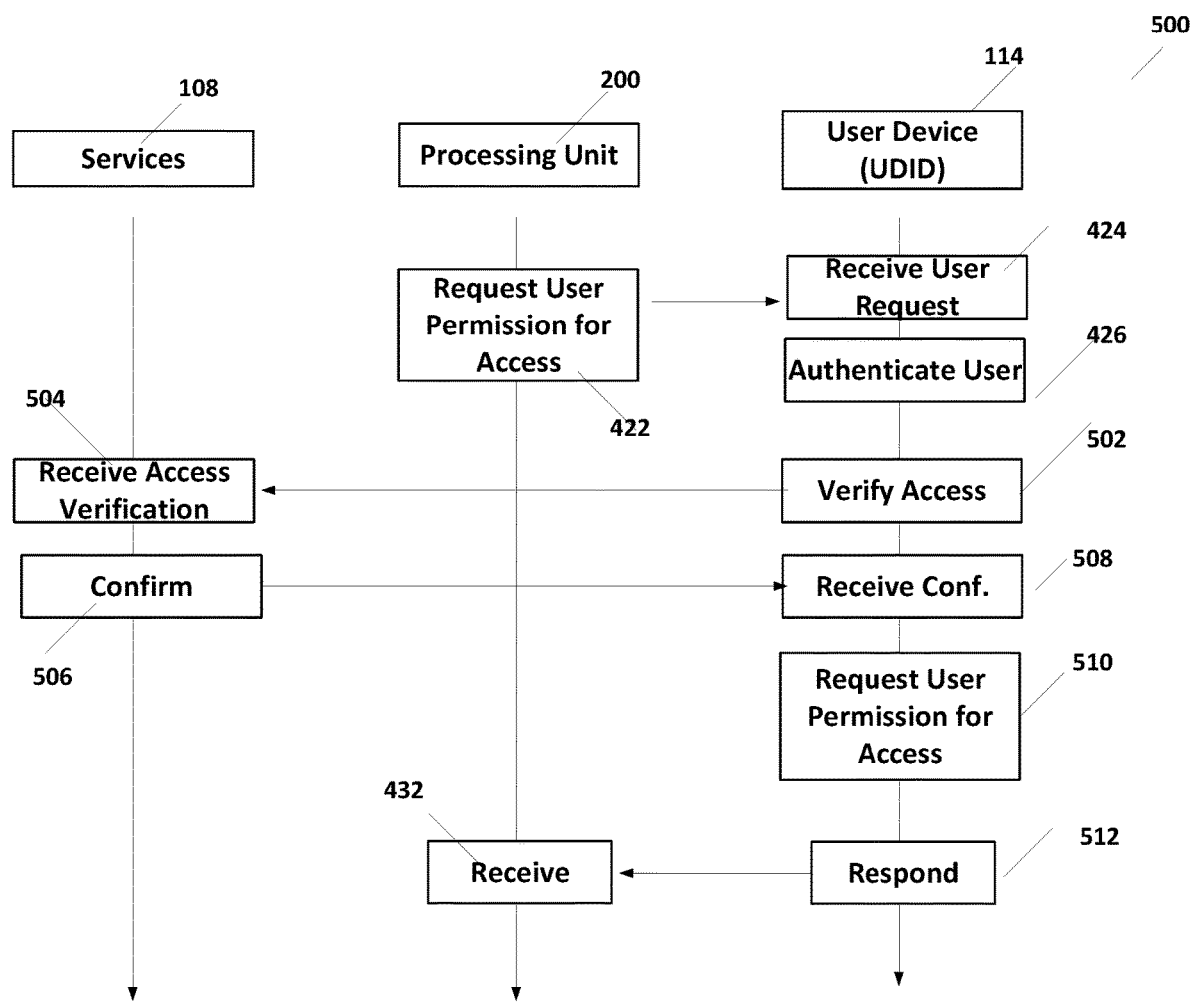
FIG. 5 further illustrates communications and operation of an autonomous vehicle according to some embodiments.

FIG. 5 illustrates a more stringent verification action 500 that may be performed for some actions (e.g., approving software upgrades or other type actions). As illustrated in FIG. 5, in user device 114 after the authenticate user step 426, user device 114 proceeds to step 502. In step 502, user device 114 sends a verification message to services 108. In step 504 of services 108, the verification request is received and, if valid, in step 506 a confirmation is sent to user device 114. In step 508 of user device 114, the confirmation is received and, with the confirmation, in step 510 the user is requested to grant permission. In step 512, user device 114 responds to processing unit 200 with the results of the authentication, confirmation, and user permissions.

Phishing attacks are a common problem these days. Embodiments of the present disclosure can be used to prevent phishing attacks as well. Phishing attacks would be received, typically, at user device 114, and possibly at processing unit 200 as a request for action. In some embodiments, AI can be used to read the sender's email address and compare with actual emails or communications from services 108 and, if they are not the same, delete or quarantine the emails. These emails, that typically would spoof communications from services 108, can be stored and analyzed as well.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A method of operating an autonomous vehicle, comprising:
   receiving, at the autonomous vehicle, a request from a third party to perform an action;
   requesting permission from a user device that has been paired with the autonomous vehicle to perform the action, the user device being a local device to the autonomous vehicle; and
   the autonomous vehicle performing the action if permission is received at the autonomous vehicle from the user device;
   wherein requesting permission from the user device includes detecting, at the autonomous vehicle, presence of the user device;
   wherein requesting permission from the user device further includes verifying, at the autonomous vehicle, the user device; and
   wherein verifying the user device includes
      transmitting, to the user device, a verification request,
      receiving, from the user device, a user ID, and
      determining, at the autonomous vehicle, the validity of the user ID.

2. The method of claim 1, wherein if the user device is not verified, reporting the failed verification.

3. The method of claim 1, wherein if the user device is verified, transmitting the request to the user device.

4. The method of claim 3, further including receiving a response from the user device.

5. The method of claim 4, wherein if the response is a denial, stopping and not performing the action.

6. The method of claim 4, wherein if the response is an approval, proceeding to performing the action.

7. An autonomous vehicle having a processing unit, the processing unit comprising:
   a processor;
   a memory coupled to the processor, the memory holding instructions and data for the processor;
   a vehicle interface coupled to the processor; and
   a communications interface coupled to the processor,
   wherein the processor executes the instructions stored in the memory to receive a request from a third party to perform an action with the autonomous vehicle;

request permission from a user device that has been paired with the autonomous vehicle to perform the action, the user device being a local device to the autonomous vehicle; and perform the action at the autonomous vehicle if permission is received from the user device, wherein instructions to request permission from the user device includes instructions to detect, at the autonomous vehicle, presence of the user device;

wherein instructions to request permission from the user device further includes instructions to verify, at the autonomous vehicle, the user device; and wherein instructions to verify the user device includes
instructions to transmit, to the user device, a verification request,
instructions to receive, from the user device, a user ID, and
instructions to determine, at the autonomous vehicle, the validity of the user ID.

8. The vehicle of claim 7, wherein if the user device is not verified, the instructions include instructions to report the failed verification.

9. The vehicle of claim 7, wherein if the user device is verified, transmitting the request to the user device.

10. The vehicle of claim 9, further including receiving a response from the user device.

11. The vehicle of claim 10, wherein if the response is a denial, stopping and not performing the action.

12. The vehicle of claim 10, wherein if the response is an approval, proceeding to performing the action.

\* \* \* \* \*